United States Patent

[11] 3,588,134

| | | |
|---|---|---|
| [72] | Inventor | Ward Sievenpiper<br>Milgrove, N.Y. |
| [21] | Appl. No. | 861,033 |
| [22] | Filed | Sept. 25, 1969 |
| [45] | Patented | June 28, 1971 |
| [73] | Assignee | "Automatic" Sprinkler Corporation of America<br>Cleveland, Ohio |

[54] PISTON BEARING
9 Claims, 7 Drawing Figs.

| [52] | U.S. Cl. | 277/235 |
|---|---|---|
| [51] | Int. Cl. | F16j 9/00 |
| [50] | Field of Search | 277/227, 235 |

[56] References Cited

UNITED STATES PATENTS

| 307,334 | 10/1884 | Richards | 277/227X |
|---|---|---|---|
| 530,694 | 12/1894 | Kruger | 277/235 |
| 2,268,868 | 1/1942 | Given | 277/227X |

FOREIGN PATENTS

| 857,748 | 1/1961 | Great Britain | 277/227 |

*Primary Examiner*—Laverne D. Geiger
*Assistant Examiner*—Robert I. Smith
*Attorney*—Christel and Bean ABSTRACT: A bearing for pistons and the like including synthetic plastic material forming the outer bearing surface over a generally ring-shaped supporting member of metal. The supporting member includes a series of studlike projections on each axial end face thereof, and the outer surface of the projections are flush with the bearing axial end faces defined by the plastic material.

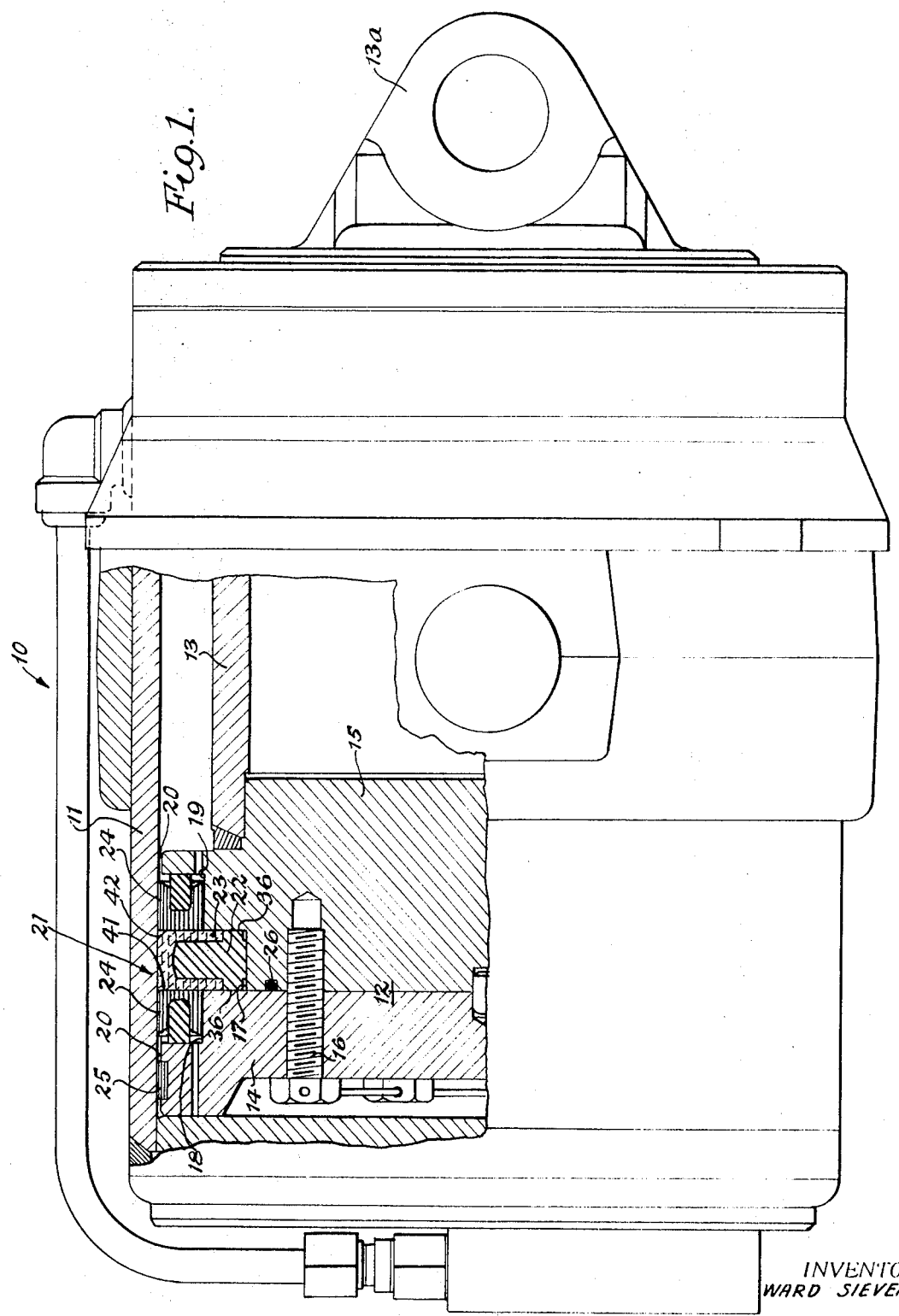

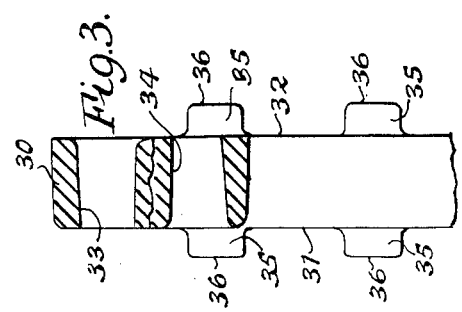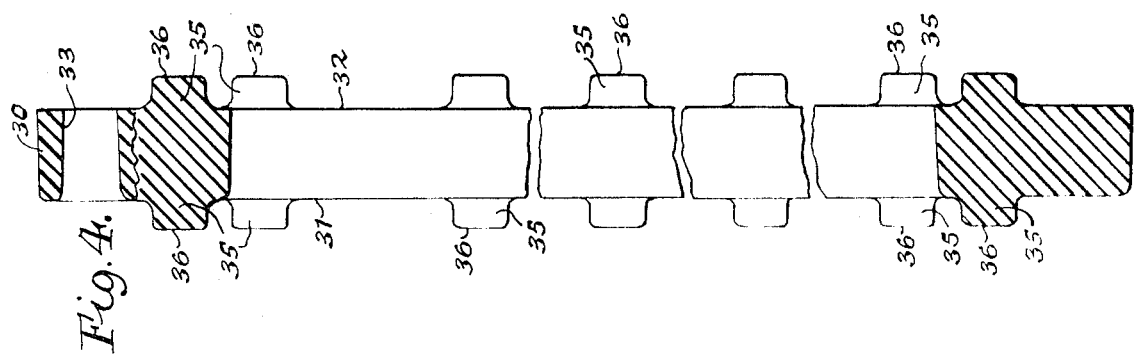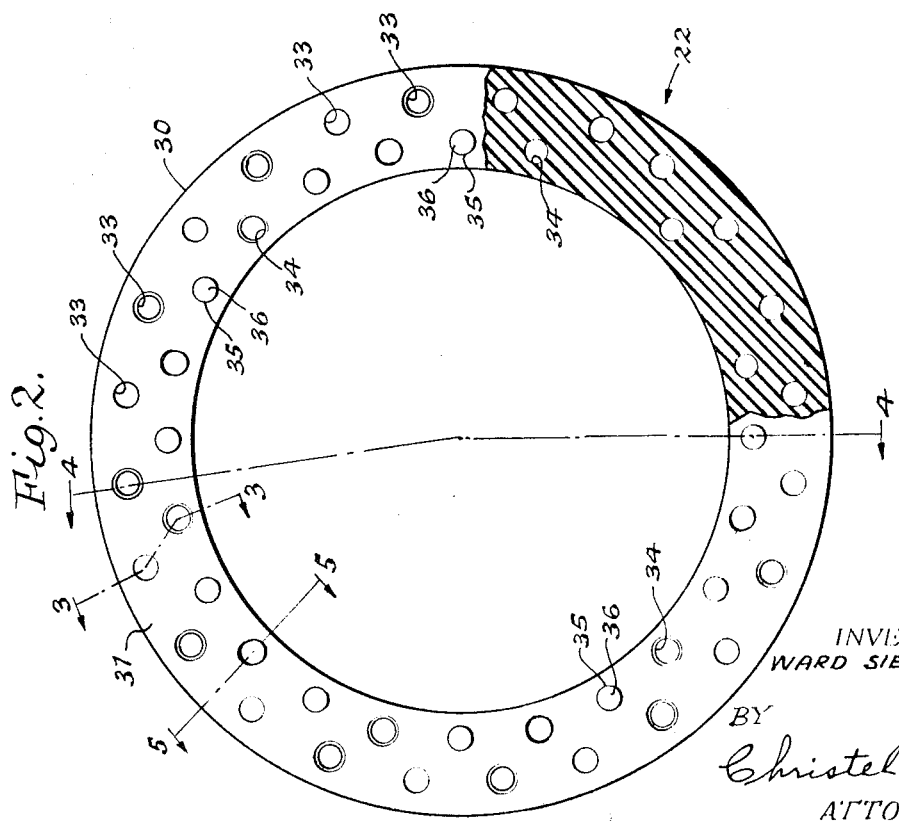

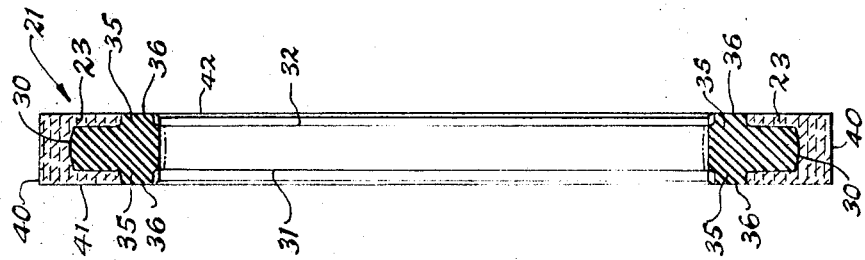
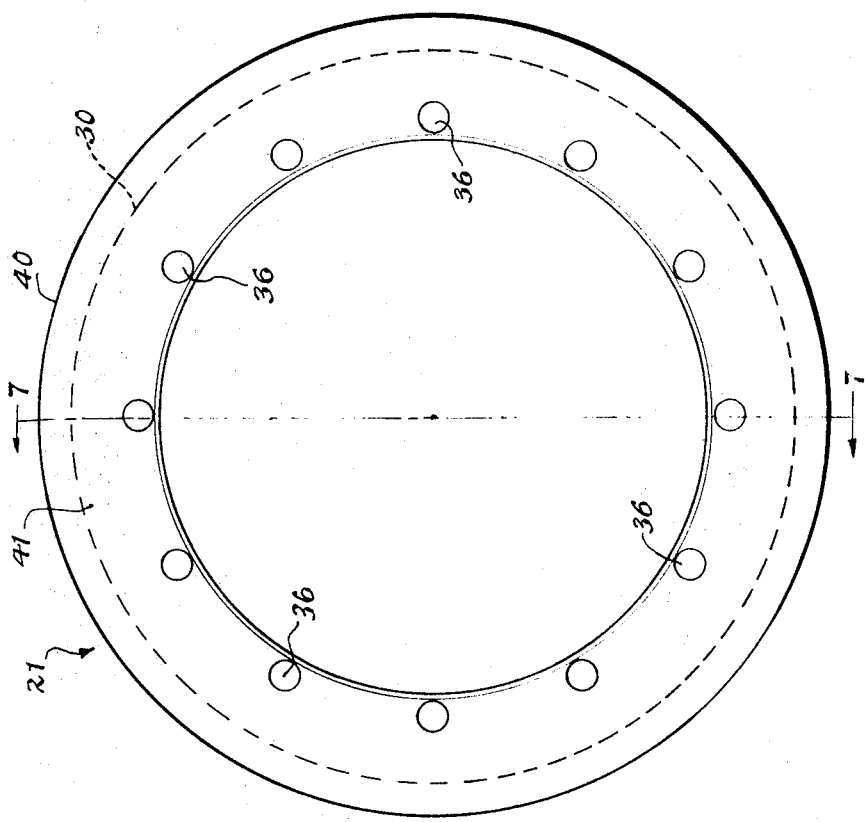

PISTON BEARING

BACKGROUND OF THE INVENTION

This invention relates to the bearing art and, more particularly, to a piston bearing of both metal and synthetic plastic material.

One area of use of the bearing of the present invention is in an hydraulic cylinder although it can be employed in various other types of machines. In recent times synthetic plastic materials such as Teflon and nylon have been employed in bearings because they advantageously resist physical abrasion and corrosion and have natural lubricating characteristics and low frictional coefficients. These synthetic plastic materials, however, have the disadvantage of being dimensionally unstable under elevated pressures and temperatures both while being made and during use. The resulting distortion in the shape of the bearing can cause clearances intolerable to the efficient functioning of the sealing members, or detrimentally affect the support of the associated members when under maximum extension, for example in hydraulic cylinders. This undesirable dimensional instability is believed to result from an inadequate rate of heat transfer from the synthetic plastic material both during cooling after the forming operation and during use.

In an hydraulic cylinder, there is need for a bearing between piston and tubular casing in which the piston is movable, and the bearing usually is seated in a circumferential groove in the piston. It is desirable in some cylinders to have the piston comprise two parts connected together with the bearing supported in an annular groove midway between the two piston halves. The fluidtight seals normally installed on either side of the bearing then exert a force against the bearing which under extreme conditions can cause undesirable premature failure. In such arrangements there is need for a bearing having improved shear strength capability.

SUMMARY OF THE INVENTION

It is, therefore, an object of this invention to provide a piston bearing partly of synthetic plastic material which will not experience shrinkage and other dimensional changes during cooling subsequent to the forming operation or during use when subjected to significant temperature changes.

It is a further object of this invention to provide such a piston bearing of significant shear strength and which when employed in an hydraulic cylinder having a two-part piston, greatly simplifies the tolerances normally required of the piston parts for maintaining a fluidtight seal.

The present invention provides a bearing for pistons and the like wherein synthetic plastic material forms the outer bearing surface. The material is molded on a ring-shaped supporting member which includes a series of studlike projections on each axial end face thereof. The supporting member thus serves also as a spacer when the bearing is positioned in a groove defined by two parts or members of a piston when connected together. The supporting member also is of good heat-conducting material and the structure thereof enhances the rate of heat transfer from the synthetic plastic material.

The foregoing and other advantages and characterizing features of the present invention will become clearly apparent upon a reading of the foregoing description of an illustrative embodiment together with the included drawing depicting the same.

BRIEF DESCRIPTION OF THE DRAWING FIGURES

FIG. 1 is a fragmentary side elevational view, partially in section, of an hydraulic cylinder equipped with a piston bearing of the present invention;

FIG. 2 is an end elevational view, also partly in section, of the supporting member of the piston bearing of the present invention;

FIG. 3 is a fragmentary sectional view thereof taken about on line 3-3 in FIG. 2;

FIG. 4 is a cross-sectional view thereof taken about on line 4-4 in FIG. 2;

FIG. 5 is a fragmentary sectional view thereof taken about on line 5-5 in FIG. 2;

FIG. 6 is a fragmentary end elevational view of the piston bearing of the present invention; and FIG. 7 is a sectional view thereof taken about on line 7-7 in FIG. 6.

DETAILED DESCRIPTION OF THE ILLUSTRATED EMBODIMENT

The piston bearing of the present invention may be used advantageously in an hydraulic cylinder and thus, for purposes of illustration, is shown in FIG. 1 in combination therewith. Other particular types of hydraulic cylinders as well as a wide variety of other applications exist, however, in which the bearing of the present invention can be employed. Referring now to FIG. 1, there is shown an hydraulic cylinder 10 which includes, briefly, a tubular casing 11 having a piston assembly 12 axially movable therein and a rod 13, rigidly connected at one end to piston assembly 12 and adapted for connection at the other end 13a to the machine (not shown) in which it is employed. In this particular type of hydraulic cylinder, piston assembly 12 comprises two parts or members 14 and 15 juxtaposed with corresponding axial end faces connected together by suitable means such as bolts 16. Other fastening arrangements can of course be employed for connecting together piston members 14, 15. The corresponding axial end faces of members 14, 15 are of different diameters thereby defining a circumferential groove 17 when the two members are connected together. In this particular example, the axial end face of member 15 is of a diameter less than that of the end face of member 14. In addition, piston members 14 and 15 are provided with annular recesses or shoulders 18 and 19, respectively, each axially adjacent groove 17. A small gap or clearance 20 exists between the outermost surfaces of piston members 14, 15 and the inner surface of casing 11 whereby piston 12 is axially movable therein.

A piston bearing 21 provided by the present invention is shown positioned in piston groove 17. Bearing 21 includes an inner metal supporting portion or member 22 which contacts the surfaces or walls of piston groove 17 and an outer bearing portion 23 of synthetic plastic material which contacts the inner surface of casing 11. The manner in which bearing 20 is formed as well as the particular structure thereof will be described in detail hereafter. Packing members designated 24 in FIG. 1, each being of identical construction, are positioned in both recesses 18, 19 whereby each is in contact with a corresponding axial end face of bearing 21 as well as being in contact with the inner surface of sleeve 11. A guide bearing 25 can be positioned in a circumferential recess in piston part 14 so as to be in contact with the inner surface of sleeve 11, and an O-ring 26 is included between piston parts 14, 15, being received in a groove provided in one of the piston parts, for example part 15.

As a result of this arrangement, piston bearing 21 is constructed so as to have the advantages of a bearing surface of synthetic plastic material together with enhanced heat transfer characteristics. Heat is transferred to piston 12 which serves as a relatively large heat sink, and this prevents the cause of dimensional changes in the bearing 21 which might otherwise occur when it is subjected to high operating temperatures. In addition, when piston members 14, 15 are connected together the axial end faces thereof contact bearing 21, in particular metal-supporting portion 22, first before contacting each other and thus are "bottomed" through bearing 21. This, in turn, simplifies the tolerance requirements imposed on piston members 14, 15 together with the manner whereby the parts are connected together while maintaining a fluidtight seal. The manner in which these results are achieved now will be described.

FIGS. 2—7 show in more detail the piston bearing constructed in accordance with this invention. Referring now to FIGS. 2—5, supporting member 22 is generally ring shaped having an outer surface 30 and opposite axial end faces 31, 32 and cast or otherwise formed from a material having good heat conducting properties and structural rigidity. Member 22 preferably is cast from aluminum and in a manner providing a series of holes or apertures 33 each extending through the entire axial length of member 22, the apertures 33 being spaced circumferentially around member 22 near the outer surface 30 thereof. In addition, apertures 33 are spaced equally around the member 22, the axes or centers of the holes lying along a circle concentric with the circle defined by member 22. In addition, holes 33 are alternately drafted to opposite axial sides or end faces of member 22, the maximum preferred draft angle being 2°.

Ring member 22 also is cast in a manner providing a series of through holes or apertures 34 and integral axial projections or stud portions 35 spaced alternately around each axial end face of member 22 and radially inwardly from the series of holes 33. In other words, each of the holes or apertures 34 extends through the entire axial length of member 22, and the apertures 34 are spaced circumferentially around member 22. Stud portions 35 extend from opposite axial end faces of member 22, corresponding ones being along the same axis, and the studs 35 are spaced circumferentially around member 22 along the same path or radius as holes 34, the studs 35 and holes 34 occurring alternately circumferentially around member 22. Stud portions 35 all are of the same length and each terminates in an end surface 36, the end surfaces 36 of all studs 35 on the same side of member 22 being disposed in a single plane perpendicular to the axis of ring member 22. Holes 34 are spaced equally around the ring 22, the axes or centers of the holes 34 lying along a circle concentric with ring 22. In addition, holes 34 are alternately drafted to the opposite axial end faces 31, 32 of member 22, the maximum preferred draft angle being 2°.

Stud portions 35 are located around ring member 22 and equally spaced between holes 32. The outer end faces 36 of studs 35 as well as the axial end faces 31, 32 of ring member 22 are to be flat and parallel as shown more clearly in FIGS. 3—5. In addition, holes 34 and studs 35 preferably are staggered circumferentially relative to holes 33, that is lines joining each of the corresponding centers of holes 34, studs 35 and holes 33 with the single center of ring member 22 do not intersect.

The piston bearing 21 of the present invention is completed by molding the outer bearing surface portion 23 of synthetic plastic material on the inner supporting member 22. One synthetic plastic material which can be utilized for forming the bearing is nylon. Its low-friction characteristics and resistance to chemical action and physical abrasion are desirable for bearing usage. Another desirable synthetic plastic material having similar characteristics is the tetrafluoroethylene fluorocarbon resin marketed under the trademark Teflon. For some applications nylon is preferred because it is thermosetting, becoming permanently hard and rigid when heated or cured. Once cured, the nylon was found to remain stable up to a temperature of about 400° F. and to a pressure of around 4,000 p.s.i., these being well above the temperature and pressure conditions normally encountered.

One particular composition which was found to have highly advantageous characteristics as a bearing material consists, by weight, of 65—70 percent nylon with filler material including 25—30 percent glass fibers and 5 percent molybdenum disulfide. The glass fibers enhance the strength of the bearing material so as to increase its wear life and the molybdenum disulfide enhances its lubricity. Alternatively, Teflon can be substituted for nylon in about the same proportion by weight, unless the tendency of Teflon to "cold flow" presents a problem at the operating temperatures and pressures expected to be encountered.

The piston bearing 21 is then formed by placing supporting member 22 in the die of a conventional injection-molding machine. The synthetic plastic material is then injection molded in and about the metal supporting member 22 in intimate contact with the outer surface 30 thereof and with axial end faces 31, 32 in a manner surrounding stud members 35 up to the end surfaces 36 thereof. During the molding operation the synthetic plastic material enters and fills each of the series of holes 33 and 34 in the metal ring 22. The portions of the material which project through holes 33 and 34 form integral connections between the material overlying the opposite end surfaces 31, 32 of metal ring 22 and thus bind the whole together even through the synthetic plastic material may normally have no significant adhesion for metal.

The piston bearing 21 of the present invention is shown in FIGS. 6 and 7 in finished form. The improved heat sink characteristics of bearing 21 advantageously permit molding thereof to finish size, but alternatively it can be machined to provide the desired outer surface and edge configuration. Bearing 21 has an outer surface 40 and opposite axial end faces 41 and 42 which are parallel to each other and each of which meets outer surface 40 in a sharp, right-angle edge. In addition, end faces 41, 42 of the synthetic plastic material are flush with the end surfaces 36 of metal stud members 35. In other words each of the end faces 41, 42 and surfaces 36 on corresponding sides of bearing 21 are coplanar.

The piston bearing of the present invention has been found to cool rapidly after the high-temperature forming process so as to avoid the problem of shrinkage. The metal-supporting member 22 readily and quickly conducts heat from the synthetic plastic material both radially inwardly and in opposite axial directions through stud portions 35. Member 22 acts as a heat sink and transfers heat to the mold where it is transferred further or dissipated. This, in turn, prevents unwanted dimensional changes in bearing portion 23.

The same metal-supporting member 22, when in contact with other heat-conducting elements while the bearing 21 is in use, again acts as a heat sink to enhance the transfer of heat through the bearing and avoid dimensional instability under elevated temperatures. As shown in FIG. 1, bearing 21 is disposed so that the inner surface of supporting member 22 is in contact with the surface of piston part 15 defining the bottom wall of groove 17 and so that the end surfaces 36 of stud portions 35 are in contact with corresponding surfaces of piston parts 14, 15 which define the sidewalls of groove 17.

As a result, heat is transferred in a radial inward direction and in opposite axial directions through metal-supporting member 22 to piston parts 14, 15 which also are of heat-conducting material, e.g. metal. Heat is transferred further or dissipated in piston 12 and in a highly efficient manner due to the fact that piston 12 is of a relatively much greater size than bearing 21.

The piston bearing 21 of the present invention thus is characterized by having all the advantages of a synthetic plastic bearing surface together with enhanced heat transfer properties which eliminate this cause of dimensional instability in synthetic plastic materials. In addition, the piston bearing of the present invention cooperates with piston members 14, 15 in a manner which simplifies the tolerances otherwise required of these piston parts. Referring now to FIG. 1 it is seen that when bearing 21 is positioned in groove 17 and piston part 14 is connected to piston part 15 through bolt 16 or other connecting means, parts 14 and 15 contact bearing 21 before contacting each other. More particularly, the end surfaces 36 of stud portions 35 contact corresponding axial end faces or surfaces of piston parts 14 and 15. As a result, supporting member 22 of bearing 21 acts as spacer for piston parts 14, 15 by virtue of the metal-to-metal contact of parts 14 and 15 with the end surfaces 36 of stud portions 35. Piston parts 14, 15 thus can be bottomed through bearing 16 which simplifies the tolerances otherwise imposed on parts 14, 15 to obtain a fluidtight connection therebetween. The parts 14, 15 moreover can be connected together by simple means, for example bolt 16. The provision of metal stud portions 35 having end surfaces 36 flush with the axial end faces 41, 42 of bearing 21 has the advantage that the piston parts are supported firmly by the bearing through metal-to-metal contact and the plastic portion of the bearing is protected and preserved by the metal portion. The use of the metal inner member imparts a greatly improved shear strength capability to bearing 21 since projections 35 present a direct metal-to-metal support with the piston halves.

It is therefore apparent that the present invention accomplishes its intended objects. While a single specific embodiment of the present invention has been described in detail, this has been done by way of illustration without thought of limitation.

I claim:
1. A bearing for pistons and the like comprising:
   a. a generally ring-shaped supporting member having an outer surface and opposite axial end faces;
   b. a series of studlike projections extending from each axial end face of said supporting member, said projections each having an end surface spaced from the corresponding axial end face of said supporting member, the end surfaces of all projections on corresponding sides of said supporting member being disposed in the same plane; and
   c. synthetic plastic material covering said outer surface and axial end faces of said supporting member thereby defining an outer and opposite axial end faces of said bearing, the bearing opposite axial end faces each being substantially coplanar with the end surfaces of said projections on corresponding sides of said bearing.

2. The bearing as defined in claim 1 wherein said supporting member is of metal and said projections are integral therewith.

3. The bearing as defined in claim 1 wherein said synthetic plastic material consists, by weight, of about 65—70 percent nylon, about 25—30 percent glass fibers and about 5 percent molybdenum disulfide.

4. The bearing as defined in claim 1 wherein said synthetic plastic material consists, by weight, of about 65—70 percent Teflon, about 25—30 percent glass fibers and about 5 percent molybdenum disulfide.

5. The bearing as defined in claim 1 wherein said projections are spaced circumferentially around said supporting member and wherein a plurality of apertures are provided through said supporting member and spaced circumferentially around said member and between corresponding ones of said projections.

6. The bearing as defined in claim 5 further including an additional plurality of apertures provided through said supporting member and spaced circumferentially around said supporting member and spaced radially from said projections.

7. The bearing as defined in claim 6 wherein said apertures are alternately drafted to opposite axial end faces of said supporting member, the draft angle being about 2°.

8. The bearing as defined in claim 1 in combination with an hydraulic cylinder including a piston relatively reciprocable therein and provided with a circumferential groove having sidewalls and a bottom, said end surfaces of said projections contacting corresponding sidewalls of said groove when said bearing is positioned in said groove.

9. The combination as defined in claim 8 wherein said piston comprises two members juxtaposed with corresponding axial end faces connected together, the corresponding axial end faces being of unequal diameters thereby defining said circumferential groove when said two members are connected together.